Sept. 10, 1963  R. H. SEDGLEY  3,103,124
IMPROVED V-BELT
Filed June 16, 1961

INVENTOR.
ROBERT H. SEDGLEY
BY
Russell, Chittick & Pfund
ATTORNEYS

United States Patent Office 3,103,124
Patented Sept. 10, 1963

3,103,124
IMPROVED V-BELT
Robert H. Sedgley, Concord, N.H., assignor to Arthur S. Brown Mfg. Co., Tilton, N.H., a corporation of New Hampshire
Filed June 16, 1961, Ser. No. 117,661
2 Claims. (Cl. 74—234)

This invention relates to improvements in belt construction and more particularly to improvements in the construction of endless belts having a generally isosceles trapezoidal cross-section and commonly known as V-belts.

Under the teachings of the prior art it has been common to construct such belts of rubber or like material. In order to strengthen these belts it has been common to employ longitudinally disposed strengthening members within a substantially larger mass of rubber. Such belts have been adequate for many uses, but they have several serious drawbacks when used in special applications where uniformity of effective pitch length is important.

In V-belts constructed according to the teachings of the prior art having longitudinally disposed strengthening members it has been difficult to control accurately the position of the strengthening member within the rubber structure. As a result, the strengthening member or members have tended to be disposed in an irregular path through the belt rather than being consistently and evenly spaced from the exterior walls thereof. This irregularity of positioning of the strengthening member results in slight variations in resistance of the belt walls to compression. Thus when a belt constructed under the teachings of the prior art is used in a V-pulley which subjects the walls of the belt to heavy wedging compression, the position of the belt relative to the pulley shifts constantly as the points of greater and less resistance to compression pass through the tapered restricted passage between the V-pulley faces. This shifting introduces corresponding variations in the effective drive speed of the pulley as translated through the belt. These variations are accentuated when small V-belts are used and when the spacing of the V-pulley faces is made adjustable for purposes of precise speed variation.

Accordingly it is an object of my invention to construct a V-belt having a strengthening member which is longitudinally uniform throughout the belt and which is evenly spaced from the walls thereof.

It is a further object of my invention to construct a V-belt the walls of which present a substantially uniform resistance to compression throughout their entire length.

It is still another object of my invention to construct a V-belt having a high degree of uniformity of exterior dimensions and which will substantially resist any forces tending to change the dimensions of the belt during operation.

In the practice of my invention in a preferred embodiment thereof I construct a V-belt by dipping a round belt carcass in a thermoplastic or thermosetting resinous elastomer. Thereafter the coated round belt carcass is molded into the shape of a V-belt under high pressure.

It is a feature of my invention that the resinous elastomer compensates for any random surface irregularities in the round belt carcass.

It is another feature of my invention that the fibers of the round belt carcass are hot pressed into the desired shape and further anchored in position by means of the resin thereby giving them the desired V-belt configuration while still retaining flexibility sufficient to compensate for differing forces acting upon the belt.

These and other objects and features of my invention will appear as the description proceeds with the aid of the accompanying drawings, in which.

Having reference now to the accompanying drawings for a more particular description of my invention, I construct a V-belt 10 having an interior carcass 12 and an exterior casing 14. The carcass 12 is substanitally cylindrical in configuration prior to construction of the V-belt. It is formed from yarn and is preferably endless woven as a continuous helix, as a braided cord or as opposed helices, the latter being shown in FIG. 4. The helical or braided construction is preferred because it produces an extremely uniform carcass.

After a carcass 12 of desired size has been formed it is dipped in a thermoplastic or thermosetting resin which provides the casing 14. It will be understood that vulcanizable and other elastomers may be substituted for the thermoplasttic or thermosetting resin.

Figure 5:
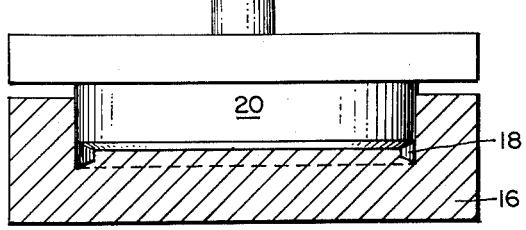

After the carcass has been dipped in the resin it is molded into a V-shape. This is accomplished by providing a female mold 16 having an annular mold cavity 18 of the desired size and shape. (See FIG. 5.) The coated carcass 12 is placed in the annular cavity 18 and is subjected to substantial pressure (about 20 tons p.s.i.) by closing the mold with the male plunger 20. Heat is applied to the mold to cure the resin. This process produces a belt of extremely uniform dimension.

Figure 1:
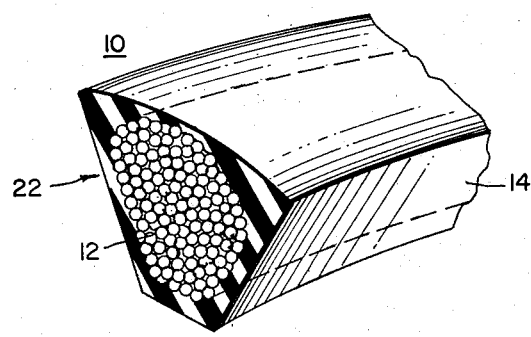
FIG. 1 is a fragmentary view in perspective of a section of V-belting constructed according to my invention.
Figure 2:
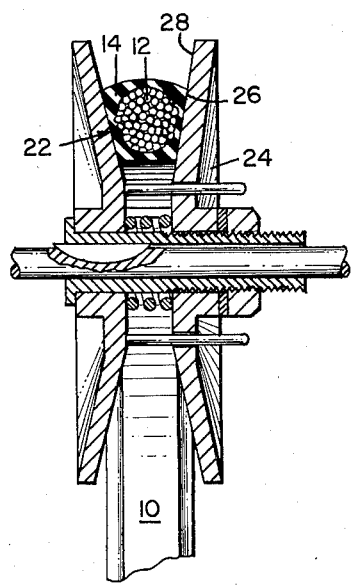
FIG. 2 is a side view partially in section of a belt according to my invention passing over a variable speed V-pulley.

As shown in FIGS. 1 and 2 the carcass 12 is deformed somewhat from its original cylindrical shape by the molding process. It is to a large extent this deformation which causes the exceptional results obtained with the belt of my invention. It will be noted that, as molded, the carcass 12 is evenly spaced from the exterior surfaces of the casing 14. It will further be noted that the wall which separates the carcass 12 from the exterior of the casing 14 is relatively thin as indicated at 22 in FIG. 2.

Because the carcass 12 is uniformly deformed and because the casing 14 has relatively thin walls which are substantially the same throughout their entire length, it will be observed that the belt 10 has a generally uniform resistance to compression, thus overcoming one of the major defects in V-belts constructed heretofore.

It will be further noted that after molding the belt 10 will retain its molded shape to a substantial degree. Upon tensioning of the belt 10 the V-shape is assured. Thus, as shown in FIG. 2, when the belt 10 is disposed around a pulley such as the variable speed pulley 24, the side faces 26 of the belt 10 engage the faces 28 of the pulley 24 in a continuous uniform fashion. Since the carcass 12 comprises the substantial portion of the V-belt 10 the major portion of the stress placed on the belt is taken up by the carcass. Since it is flexible to a degree it can compensate for irregularities in the faces 28 of the pulley 24 and since it has a uniform resistance to compression it will remain in substantially the same attitude between the faces 28 throughout its entire length.

Figure 3:
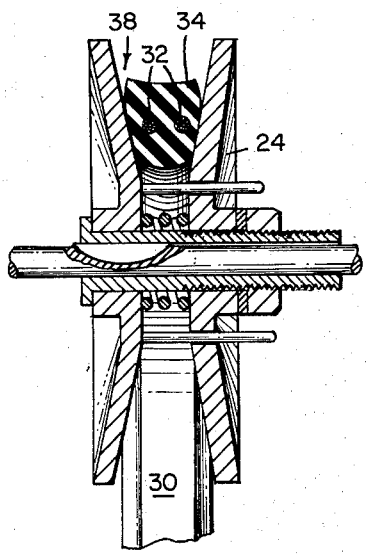
FIG. 3 is a side view partially in section similar to FIG. 2 and showing a conventional V-belt passing over the variable speed V-pulley.

FIG. 3 shows a belt 30 constructed according to the teachings of the prior art having reinforcing members 32 longitudinally disposed therethrough. It will be noted that belt 30 tends to resist compression in the horizontal plane of the members 32 to a substantially greater degree than it does throughout the rest of its height. It will also be noted that the rubber 34 of belt 30 has the function of elongating or compressing alongside of the dimensionally stable members 32 as the belt alternately bends and straightens. In the belt 10 constructed according to my invention the carcass 12 is flexible in and of itself and the casing 14 serves principally as surfacing material.

Figure 4:
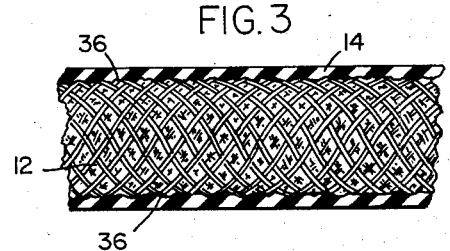
FIG. 4 is a fragmentary broken away side view showing a section of V-belting according to my invention; and, FIG. 5 is a side view partially in section of a mold for forming the V-belt of my invention.

In this regard it will be noted that the resin forming the casing 14 does not penetrate into the interior of the carcass 12. In FIG. 4 a carcass 12 is shown having a rough exterior 36 with random variations. The resin forming the casing 14 will be observed to have penetrated only the first few fibers of the carcass 12. In this way the casing 14 contributes substantially to the cross-sectional uniformity of the belt 10. It also provides a smooth, wear resistant surface and assists in holding the carcass 12 in the V-belt shape.

With regard to the tendency of the carcass 12 to return to its original cylindrical shape it should be noted that the fibers which comprise the carcass 12 have been pressed or crimped under extreme heat and pressure into the desired shape and that they have been anchored in that shape by means of the resin. Thus, although the carcass 12 may have some tendency to return to its original cylindrical shape, the crimping of the fibers insures that upon tensioning of the belt 10 it will assume the desired V-shape. This result should be contrasted with the result obtained using the standard rubber belt 30 as seen in FIG. 3. It will be noted that upon stressing of the belt 30 as it proceeds around pulley 24 the upper portion of the belt draws away from the walls of the pulley as indicated at 38. This causes a loss of traction which is accentuated by the variations in resistance to compression due to the variations in spacing of the members 32 within the belt 30.

It will now be obvious to one skilled in the art that various modifications and changes may be made in the construction of the belt of my invention without departing from the spirit and scope of the invention. Among these, for example, it would be possible to thoroughly impregnate the belt carcass with the resin. This could be accomplished initially by the use of a treated yarn rather than dipping the belt carcass in the resin.

What I claim as new and desire to secure by Letters Patent of the United States is:

1. A belt comprising, a carcass of fiberous flexible material having a substantially uniform cross-sectional density, and a casing of moldable material selected from the group consisting of thermoplastic and thermosetting resins, said casing surrounding said carcass and being of a thickness substantially less than that of said carcass, and only superficially penetrating the surface of said carcass.

2. A belt as defined in claim 1 further characterized by the fibers of said carcass lying freely adjacent to each other and substantially crimped into conformance with each other in a substantially V-belt cross-section.

References Cited in the file of this patent
UNITED STATES PATENTS

| | | |
|---|---|---|
| 398,429 | Midgley | Feb. 26, 1889 |
| 1,976,015 | Gilmer et al. | Oct. 9, 1934 |
| 2,945,390 | Bush et al. | July 19, 1960 |

FOREIGN PATENTS

| | | |
|---|---|---|
| 883,536 | Germany | July 20, 1953 |